United States Patent [19]
Judd

[11] 3,781,712
[45] Dec. 25, 1973

[54] GAS LASER WITH DISCHARGE CONDITIONING USING ULTRAVIOLET PHOTONS GENERATED IN HIGH CURRENT DENSITY PRELIMINARY DISCHARGE

[75] Inventor: O'Dean P. Judd, Los Alamos, N. Mex.

[73] Assignee: Hughes Aircraft Company, Culver City, Calif.

[22] Filed: Oct. 17, 1972

[21] Appl. No.: 298,218

[52] U.S. Cl.................................. 331/94.5, 330/4.3
[51] Int. Cl................................................ H01s 3/09
[58] Field of Search...................... 331/94.5; 330/4.3

[56] References Cited
UNITED STATES PATENTS

| | | | |
|---|---|---|---|
| 3,662,284 | 5/1972 | Beaulieu et al. | 331/94.5 |
| 3,702,973 | 11/1972 | Daugherty et al. | 331/94.5 |
| 3,721,915 | 3/1973 | Reilly | 331/94.5 |

OTHER PUBLICATIONS

Laflamme, Double Discharge Excitation for Atmospheric Pressure Carbon Dioxide Lasers. Rev. Sci. Instr., Vol. 41, No. 11 (Nov. 1970) pp. 1578–1581.

*Primary Examiner*—William L. Sikes
*Attorney*—W. H. MacAllister, Jr. et al.

[57] ABSTRACT

Discharge excited gas laser arrangements are disclosed wherein a preliminary electrical discharge having a current density of at least about one ampere per $cm^2$ is established in a first region of the laser gas. This discharge produces a large number of ultraviolet photons which propagate through the gas and collide with neutral gas molecules to produce electron-ion pairs in the gas. After a given time delay of at least about one $\mu$sec. subsequent to the initiation of the preliminary discharge, a main electrical discharge is initiated in a second region of the gas spaced from and in photon communication with the first region to excite the gas to a lasing condition. As a result of the background distribution of electron-ion pairs generated by the ultraviolet photons radiated into the main discharge region at the time the main discharge is commenced, a highly uniform laser exciting discharge is achieved.

12 Claims, 4 Drawing Figures

GAS LASER WITH DISCHARGE CONDITIONING USING ULTRAVIOLET PHOTONS GENERATED IN HIGH CURRENT DENSITY PRELIMINARY DISCHARGE This invention relates to lasers, and more particularly relates to gas lasers excited by an electrical discharge wherein a preliminary discharge generating ultraviolet photons is employed to precondition the laser gas in a manner which enhances the uniformity of the laser exciting discharge.

In many electrically excited gas lasers, especially those operating at high gas pressures, the laser power output and beam quality (uniformity of the amplitude and phase of the generated light waves) depend to a large degree on the ability to produce a large volume of spatially uniform population inversion in the laser gas. The volume and uniformity of the population inversion are directly dependent upon the volume and uniformity of the electrical discharge used to excite the gas. Similarly, in electrically triggered pulsed chemical lasers the laser power output and beam quality depend upon the uniformity of the electrical discharge used to initiate the reaction of the chemical reagents. Thus, in the aforementioned types of lasers the achievement of a more spatially uniform electrical discharge over a relatively large gas volume will result in higher power output and improved laser beam quality.

In one type of prior art arrangement for enhancing the spatial uniformity and increasing the volume of a high pressure electrical discharge in a laser gas, an externally produced high energy electron beam is directed into the gas discharge region to condition the discharge. Electrons of energy greater than about 100 keV are emitted from one or more electron guns and are transmitted through a thin metallic foil into a chamber containing high pressure laser gas. After these high energy electrons have produced collisional preionization of the gas, a high voltage is applied across discharge initiating electrodes. Due to the large density of background preionization in the gas, a uniform gas discharge ensues. For a more detailed description of electron beam discharge conditioning arrangements for gas discharge lasers, reference may be made to U.S. Pat. No. 3,641,454, issued Feb. 8, 1972 to Barton Krawetz, and to an article "More Laser Power with Electron-Beam Control" in Physics Today, January 1972, pages 17-19.

In another type of prior art arrangement for enhancing the uniformity of the electrical discharge in a laser gas, a low energy preliminary electrical discharge is initiated between an auxiliary trigger electrode and one of the main discharge electrodes prior to initiation of the main discharge. The low energy preliminary discharge provides a distributed source of electrons which produces sufficient background preionization in the gas near the electrode surfaces to obtain a uniform discharge between the main electrodes. Little or no ionization occurs throughout the remainder of the gas, however, and the discharge volume is limited. For further details concerning the low energy preliminary discharge type of gas laser discharge conditioning arrangement, reference may be made to U.S. Pat. No. 3,662,284, issued May 9, 1972 to Alexandre J. Beaulieu and Albert Laflamme, to Laflamme's article "Double Discharge Excitation for Atmospheric Pressure $CO_2$ Lasers" in The Review of Scientific Instruments, Nov. 1970, pages 1578-1581, to an article "Improved Excitation Techniques for Atmospheric Pressure $CO_2$ Lasers," by H. M. Lamberton and P. R. Pearson in Electronics Letters, Mar. 25, 1971, pages 141-142, and to an article "TEA Lasers at Marcoussis," by Renee Dumanchin, Laser Focus, August 1971, page 32.

An electron beam discharge conditioning arrangement has been used with a $CO_2$ laser to provide an output energy density of about 50 joules per litre at an operating efficiency of around 25 percent. Nevertheless such arrangements are relatively complex and possess serious problems with mechanical strength and durability. The electron gun requires operating voltages in excess of 100 keV, while the metallic foil must be sufficiently thin to permit adequate penetration by the electron beam but thick enough to mechanically support pressure differentials in excess of one atmosphere.

On the other hand, while the low energy preliminary discharge arrangements are structurally simpler and have greater ruggedness and durability than the electron beam arrangements, the low energy preliminary discharge arrangements typically provide $CO_2$ laser output energy densities of approximately 1 to 18 joules per litre at operating efficiencies of about 2 to 17 percent.

Accordingly, it is an object of the present invention to provide a gas laser discharge conditioning arrangement which achieves laser output energy densities and operating efficiencies comparable to those of electron beam arrangements, while at the same time retaining the structural simplicity and mechanical ruggedness and durability of low energy preliminary discharge arrangements.

It is a further object of the invention to provide an arrangement for enhancing the uniformity of an electrical discharge in a high pressure laser gas, and which arrangement provides increased flexibility in controlling the discharge operating conditions.

It is a still further object of the invention to provide a gas laser discharge conditioning arrangement wherein a uniform discharge may be achieved over as large a volume as practical.

In an arrangement according to the invention, a preliminary electrical discharge having a current density of at least about one ampere per $cm^2$ is established in a first region of a laser gas. This discharge produces a large number of ultraviolet photons which propagate through the gas and collide with neutral gas molecules to produce electron-ion pairs in the gas. At a preselected time equal to or greater than about one $\mu sec$. after initiation of the preliminary discharge, a main electrical discharge is initiated in a second region of the gas spaced from and in photon communication with the first region to excite the gas to a lasing condition. As a result of the background distribution of ultraviolet photon generated electron-ion pairs in the second region at the time the main electrical discharge is commenced, the laser exciting discharge is highly uniform over a large volume, thereby enabling high laser power output and excellent laser beam quality to be achieved.

Additional objects, advantages and characteristic features of the present invention will become readily apparent from the following detailed description of preferred embodiments of the invention when considered in conjunction with the accompanying drawings wherein.

Figure 1:
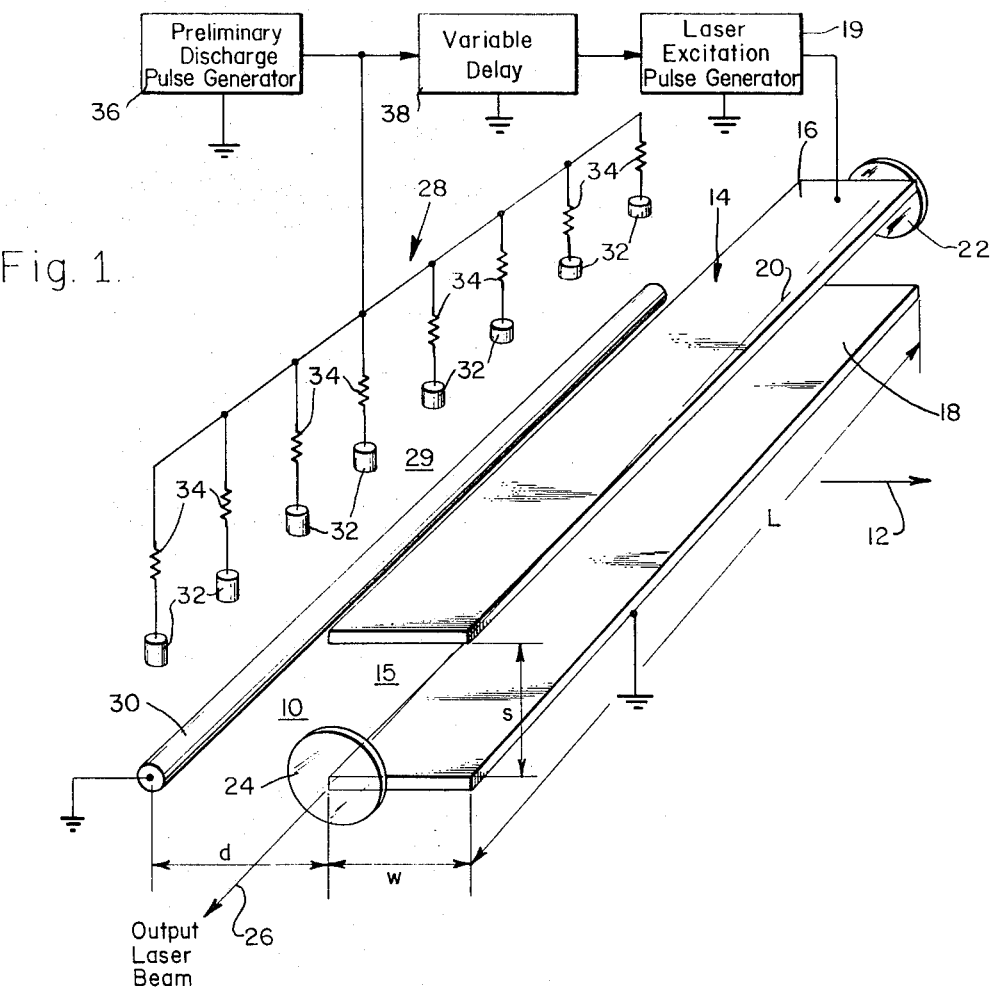
FIG. 1 is a diagrammatic perspective view illustrating a gas laser arrangement in accordance with one embodiment of the invention.
Figure 2:
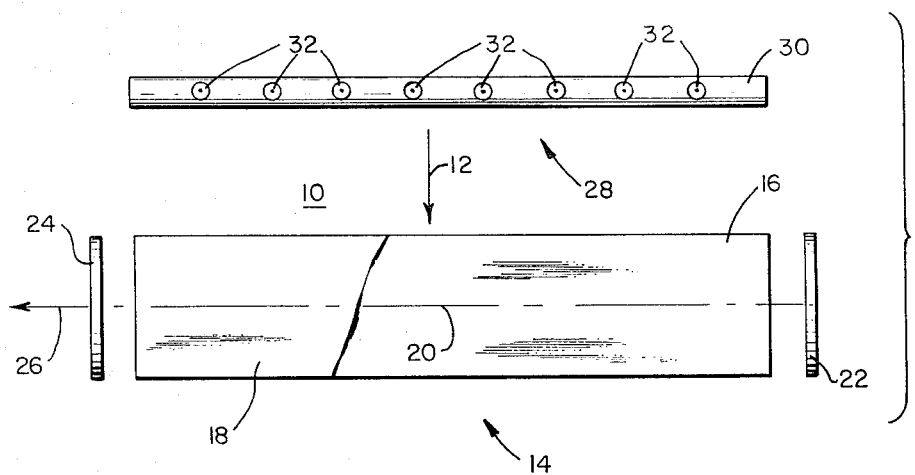
FIG. 2 is a top plan view of the arrangement of FIG. 1.

Referring to FIGS. 1 and 2 with greater particularity, an arrangement is shown for exciting a volume of laser gas 10 to a lasing state with a highly uniform electrical discharge. The gas 10 is confined within a suitable conventional containing vessel which, for reason of simplicity, is not shown in the drawings. The containing vessel may be provided with gas inlet and output ports along with associated pumping apparatus to enable the laser gas to flow in the direction of arrow 12 if a flowing gas laser is desired. Gas flow is not necessary for operation of arrangement, however.

The gas 10 may be any gasious medium capable of either undergoing laser action itself or exciting another gas to a lasing condition. As a specific example in connection with a molecular laser, the gas 10 may be a mixture of $CO_2$, $N_2$ and He in the ratio of 1:1:8 by mole fraction. As a further example in connection with a chemical laser, the gas 10 may be $H_2$ or $D_2$ to be mixed with $F_2$. Exemplary gas pressures may range essentially from 100 to 760 Torr. If gas flow is employed, gas flow velocities ranging from around a few meters per second to Mach 1 and above would be suitable.

In order to establish a main electrical discharge in the laser gas 10 and thereby excite the laser gas to a lasing condition, a main electrode array 14 is provided adjacent to a region 15 of the gas 10. In the embodiment illustrated in FIGS. 1 and 2 the electrode array 14 consists of a pair of parallel electrically conductive plates 16 and 18 disposed on opposite sides of the main discharge region 15. As a specific example in connection with the aforementioned $CO_2$—$N_2$—He laser, the plates 16 and 18 may have a length L = 50 cm, a width $w = 5$ cm, and a separation $s = 2.5$ cm.

The aforementioned main electrical discharge is established by applying appropriate voltage pulses between the electrodes 16 and 18. For this purpose electrode 16 may be connected to a laser excitation pulse generator 19 while the other electrode 18 is connected to a level of reference potential illustrated as ground. Exemplary pulses from the generator 19 which may be used with apparatus having the aforementioned specification parameter values (and which are appropriate for achieving laser action in $CO_2$—$N_2$—He) are approximately 20 to 30 kv pulses at a current of around 2 ka. Typical pulse durations range essentially from 0.5 to 10 $\mu$sec., with pulse repetition frequencies ranging essentially from 1 to 4 Hz.

A laser optical cavity structure is provided adjacent to the main discharge region 15 and is preferably disposed so that the axis of the generated laser beam, designated by the numeral 20, is centrally located between the plates 16 and 18 and extends parallel to the plate length L. As shown in FIGS. 1 and 2, the laser optical cavity may consist of a pair of aligned reflectors 22 and 24 disposed perpendicular to the laser beam axis 20 and spaced from opposite ends of the electrode array 14. One of the reflectors such as 24 is made partially transmissive so that an output laser beam 26 may be obtained.

An ultraviolet photon generating preliminary discharge electrode array 28 is disposed adjacent to a region 29 of the gas 10 and is spaced from the main discharge electrode array 14 by a distance d which, in an arrangement constructed with the aforementioned exemplary parameter values, may be 7.5 cm, for example. In the embodiment illustrated in FIGS. 1 and 2, the electrode array 28 includes an elongated sole electrode 30 disposed parallel to the laser beam axis 20 on one side of gas region 29 and a plurality of intercoupled electrode segments 32 disposed on an opposite side of region 29 and aligned with one another along a direction parallel to the longitudinal axis of electrode 30. The sole electrode 30 is preferably disposed substantially coplanar and coextensive with main discharge electrode 18. Similarly, the electrode segments 32 are preferably disposed substantially coplanar with main discharge electrode 16, with the end electrode segments 32 substantially aligned with the ends of the sole electrode 30. In a specific $CO_2$—$N_2$—He laser which has been constructed according to FIGS. 1 and 2 using the aforementioned exemplary parameter values, 46 electrode segments 32 were employed; however, it should be understood that a greater or lesser number of electrode segments are also suitable.

Each electrode segment 32 is electrically connected, preferably via a ballast resistor 34 (which typically may provide a resistance of around 10K ohms), to the output of a preliminary discharge pulse generator 36. Exemplary pulses from the generator 36 which are appropriate for achieving a highly uniform main discharge in a $CO_2$—$N_2$—He laser constructed with the aforementioned exemplary parameter values may range essentially from 10 kv to 16 kv at a current ranging approximately from 40 to 400 amps. Exemplary pulse durations may range essentially from 1 to 10 $\mu$sec., with typical pulse repetition frequencies ranging essentially from 1 to 40 Hz.

In order to allow sufficient time for ultraviolet photons generated as a result of the preliminary discharge in region 29 to properly condition the laser gas in main discharge region 15 before commencement of the main discharge, the laser exciting main discharge is initiated a preselected time after the initiation of the preliminary discharge. For this purpose a delay network 38 is interposed between the preliminary discharge pulse generator 36 and the laser excitation pulse generator 19 to trigger the pulse generator 19 and thereby initiate the laser exciting main discharge a preselected time after initiation of the preliminary discharge. The time delay provided by the delay network 38 is preferably made variable in order to afford greater control over main discharge conditions. As a specific example, for a $CO_2$—$N_2$—He laser constructed with the aforementioned parameter values, the delay network 38 may provide a time delay which is selectively variable between about 1 $\mu$sec. and about 10 $\mu$sec.

In the operation of a laser arrangement according to FIGS. 1 and 2, an output pulse from the pulse generator 36 energizes the preliminary discharge electrode array 28, initiating an electrical discharge in region 29 of the laser gas 10. This electrical discharge produces in the gas 10 a large number of ultraviolet photons which propagate through the gas 10. Collisions between these ultraviolet photons and neutral gas molecules produce electron-ion pairs in the gas 10, including region 15 of the gas between main discharge electrodes 16 and 18.

After the time delay provided by delay network 38 (which enables the density of background electron-ion pairs in gas region 15 to build up to the desired value and become spatially uniform), the laser excitation pulse generator 19 is triggered. A main electrical discharge is thus initiated in region 15 of the gas 10 which excites the gas to a lasing state. As a result of the background distribution of ultraviolet photon generated electron-ion pairs in the gas region 15 at the time the laser exciting main electrical discharge is commenced, the laser exciting discharge is highly uniform, thereby enabling high laser output power and excellent laser beam quality to be achieved.

The number of background electron-ion pairs produced in the main discharge region 15 is a function of the rate of generation of ultraviolet photons in the preliminary discharge region 29, the time delay after initiation of the preliminary discharge, and various electron loss processes in the gas 10 (e.g. volume recombination, attachment, etc.). In order to insure that a sufficient number of background electron-ion pairs exist in the region 15 at the time of initiation of the main discharge to result in a highly uniform main discharge, the preliminary discharge current density should be at least about one ampere per $cm^2$ to insure a strong ultraviolet photon flux, and the time delay between initiation of the preliminary and main discharges should be equal to or greater than about one $\mu$sec. These values are readily achieve with apparatus having the aforementioned exemplary parameter values. It is further pointed out that the preliminary discharge need not terminate upon commencement of the main discharge, but rather may be continued concurrently with the main discharge.

A $CO_2$—$N_2$—He laser constructed according to the embodiment of FIGS. 1 and 2 has produced a laser output energy density of about 39 joules per litre (and considerably higher energy densities are believed obtainable) with an operating efficiency of around 25 percent. Thus, it will be seen that an arrangement according to the present invention is able to provide output laser energy densities and operating efficiencies comparable to those achievable with electron beam discharge conditioned $CO_2$ lasers, while at the same time affording structural simplicity and mechanical ruggedness and durability at least as good as those of low energy preliminary discharge employing arrangements. Moreover, because of the volumetric photoionization of the laser gas in an arrangement according to the invention, a uniform discharge may be achieved over as large a volume as practical.

Figure 3:
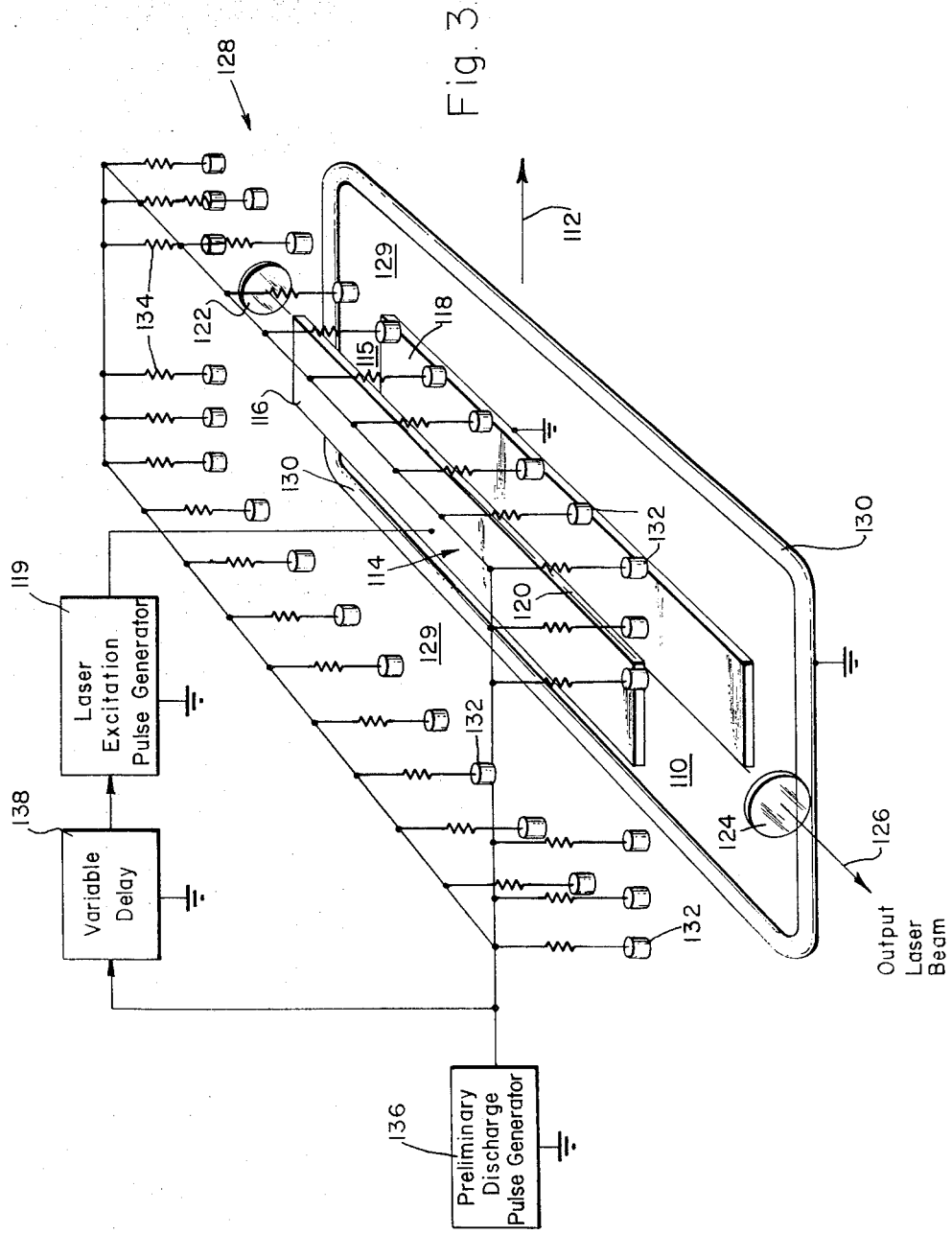
FIG. 3 is a diagrammatic perspective view illustrating a gas laser arrangement according to another embodiment of the invention.

A further embodiment of the present invention is illustrated in FIG. 3. The embodiment of FIG. 3 is similar to the embodiment of FIGS. 1 and 2, and hence components in the embodiment of FIG. 3 which correspond to respective components in the embodiment of FIGS. 1 and 2 are designated by the same second and third reference numeral digits as their corresponding components in FIGS. 1 and 2 but with the addition of a prefix numeral "1."

The embodiment of FIG. 3 differs from that of FIGS. 1 and 2 in that preliminary discharge electrode array 128 is configured to laterally surround the main discharge electrode array 114. Specifically, sole electrode 130 is disposed along a substantially rectangular path substantially coplanar with and concentrically disposed about main discharge electrode 118 on one side of preliminary discharge region 129. Interconnected electrode segments 132 are disposed along substantially rectangular path substantially coextensive with that of sole electrode 130 and substantially coplanar with and concentrically disposed about main electrode 116 on an opposite side of region 129. It should be noted that no electrode segments 132 are located in the immediate vicinity of laser beam axis 120 to ensure that no preliminary discharge occurs which interferes with the generated laser beam.

The embodiment of FIG. 3 provides a greater number of electron-ion pairs over a larger volume than the FIG. 1 embodiment, which results in a larger and more uniform ionization spatial distribution.

Figure 4:
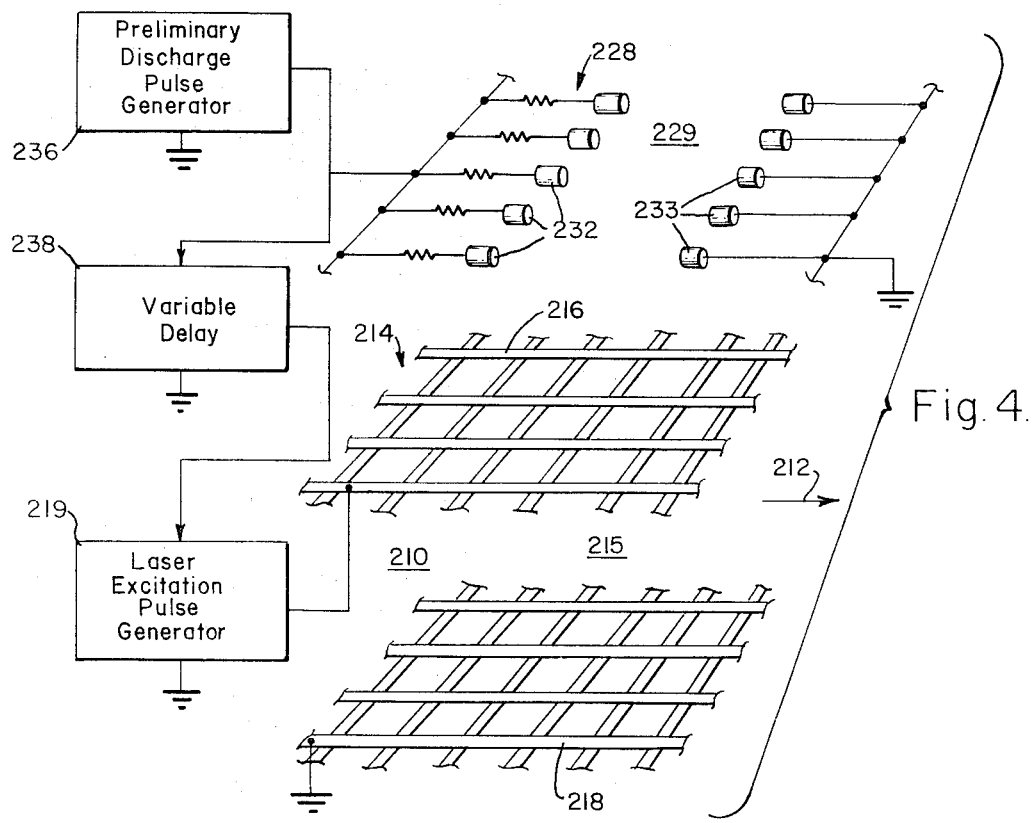
FIG. 4 is a diagrammatic perspective view illustrating a portion of a gas laser arrangement in accordance with a further embodiment of the invention.

A still further embodiment of the invention is illustrated in FIG. 4. The embodiment of FIG. 4 is similar to the embodiment of FIGS. 1 and 2, and hence components in the FIG. 4 embodiment which correspond to respective components in the embodiment of FIGS. 1 and 2 are designated by the same second and third reference numeral digits as their corresponding components in FIGS. 1 and 2 but with the addition of a prefix numeral "2."

The embodiment of FIG. 4 differs from that of FIGS. 1 and 2 in that main discharge electrode array 214 consists of a pair of parallel grid electrodes 216 and 218, and preliminary discharge electrode array 228 is disposed over electrode 216 in a plane parallel to the planes of electrodes 216 and 218. Thus, the preliminary discharge occurs along a direction perpendicular to the direction of the main discharge, the grid structure of main discharge electrode 216 enabling ultraviolet photons produced in the preliminary discharge to penetrate into main discharge region 215 between electrodes 216 and 218. In addition, as shown in FIG. 4, both electrodes of the electrode array 228 are segmented, i.e., aligned interconnected electrode segments 233 are provided in lieu of an elongated sole electrode such as 30 of FIG. 1, although it should be understood that electrode segments 233 could be replaced with a sole electrode. Moreover, although electrode array 228 is shwon disposed above main discharge electrode 216 in FIG. 4, the electrode array 228 could alternatively be disposed below main discharge electrode 218. Or, as a further alternative, a pair of electrode arrays such as 228 may be respectively disposed above main discharge electrode 216 and below main discharge electrode 218. It should be noted that when only one electrode array 228 is employed such as shown in FIG. 4, main discharge electrode 218 on the far side of discharge region 215 may be solid rather than gridded, although a grid structure is preferred for purpose of uniformity.

The embodiment of FIG. 4 is particularly useful in lasers utilizing high velocity gas flow in the direction of arrow 212, because the location of the preliminary discharge electrode array 228 out of the gas flow path minimizes gas flow disturbance.

Although the invention has been shown and described with reference to particular embodiments, nevertheless various changes and modifications which are obvious to a person skilled in the art to which the invention pertains are deemed to lie within the purview of the invention.

What is claimed is:

1. A gas laser comprising:
   means for producing an ultraviolet photon generating preliminary electrical discharge in a first region of a laser gas, said preliminary discharge having a current density of at least about one ampere per $cm^2$;
   means for producing a main electrical discharge in a second region of said laser gas spaced from and in photon communication with said first region a preselected time after initiation of said preliminary discharge to excite said gas to a lasing condition, said preselected time being at least about 1 $\mu$sec.; and
   means disposed adjacent to said second region for providing a laser optical cavity.

2. A gas laser according to claim 1 wherein said means for producing said preliminary discharge includes an elongated electrode disposed on one side of said first region, a plurality of electrically interconnected electrode segments disposed on an opposite side of said first region and substantially aligned with one another along a direction parallel to the length of said elongated electrode, and means for applying between said interconnected electrode segments and said elongated electrode an electrical pulse of sufficient voltage and current to produce in said first region an electrical discharge having a current density of at least about one ampere per $cm^2$.

3. A gas laser according to claim 1 wherein said first region laterally surrounds said second region.

4. A gas laser comprising:
   at least a pair of first electrodes disposed adjacent to a first region of a laser gas, means for applying between said first electrodes an electrical pulse of sufficient voltage and current to establish in said first region an ultraviolet photon generating preliminary electrical discharge having a current density of at least about one ampere per $cm^2$;
   a pair of second electrodes disposed adjacent to a second region of said laser gas spaced from said first region and in photon communication therewith, means for applying between said second electrodes an electrical pulse of sufficient voltage and current to excite said gas to a lasing condition a preselected time after initiation of said preliminary discharge, said preselected time being at least about one $\mu$sec.; and
   means disposed adjacent to said second region for providing a laser optical cavity.

5. A gas laser according to claim 4 wherein said pair of second electrodes have respective substantially planar extended surfaces disposed substantially parallel to and facing one another on opposite sides of said second region, and respective electrodes of said pair of first electrodes are disposed substantially coplanar with respective electrodes of said pair of second electrodes on opposite sides of said first region.

6. A gas laser according to claim 4 wherein said pair of second electrodes have respective substantially planar elongated surfaces disposed parallel to and facing one another on opposite sides of said first region; and said first electrodes include an elongated electrode disposed substantially coplanar with and parallel to one of said second electrodes on one side of said first region, said elongated electrode being substantially coextensive with said one of said second electrodes, and a plurality of electrically interconnected electrode segments disposed substantially coplanar with the other of said second electrodes on an opposite side of said first region, said electrically interconnected electrode segments being substantially aligned with one another along a direction parallel to the length of said elongated electrode, and the end ones of said electrically interconnected electrode segments being substantially aligned with respective ends of said elongated electrode.

7. A gas laser according to claim 4 wherein said pair of second electrodes have respective extended substantially planar surfaces disposed substantially parallel to and facing one another on opposite sides of said second region, and at least one of said pair of first electrodes is disposed substantially coplanar with one of said second electrodes and extends along a path laterally surrounding said one of said second electrodes.

8. A gas laser according to claim 4 wherein said pair of second electrodes have respective substantially planar elongated surfaces disposed substantially parallel to and facing one another on opposite sides of said second region; and said first electrodes include an elongated electrode disposed substantially coplanar with one of said second electrodes along a first path laterally surrounding said one of said second electrodes on one side of said first region, and a plurality of electrically interconnected electrode segments disposed along a second path substantially coextensive with said first path and coplanar with the other of said second electrodes on an opposite side of said first region.

9. A gas laser according to claim 4 wherein said pair of second electrodes are disposed substantially parallel to and facing one another on opposite sides of said second region, at least one of said second electrodes being a grid electrode, and respective electrodes of said pair of first electrodes being disposed to face said grid electrode at substantially equidistant locations from said grid electrode on opposite sides of said first region.

10. A gas laser according to claim 4 wherein said pair of second electrodes are disposed substantially parallel to and facing one another on opposite sides of said second region, at least one of said second electrodes being a grid electrode, and said first electrodes comprise first and second sets of substantially aligned electrically interconnected electrode segments disposed on opposite sides of said first region in a plane substantially parallel to and facing said grid electrode.

11. A gas laser comprising:
    at least a pair of first electrodes disposed adjacent to a first region of a laser gas, means incouding a first pulse generator for applying between said first electrodes an electrical pulse of sufficient voltage and current to establish in said first region an ultraviolet photon generating preliminary electrical discharge having a current density of at least about one ampere per $cm^2$;
    a pair of second electrodes disposed adjacent to a second region of said laser gas spaced from said first region and in photon communication therewith, means including a second pulse generator for applying between said second electrodes an electrical pulse of sufficienl voltage and current to excite said gas to a lasing condition;
    delay means coupled between said first and second pulse generators for triggering said second pulse generator at a time such that said exciting electrical pulse is applied between said second electrodes a preselected time after initiation of said preliminary discharge, said preselected time being at least about one μsec.; and means disposed adjacent to said second region for providing a laser optical cavity.

12. A gas laser according to claim 11 wherein said delay means provides a time delay which is selectively variable between about 1 μsec. and about 10 μsec.

* * * * *